(12) United States Patent
Klomsdorf et al.

(10) Patent No.: US 8,126,030 B2
(45) Date of Patent: Feb. 28, 2012

(54) MULTI-MODE WIRELESS COMMUNICATION DEVICE AND METHOD

(75) Inventors: Armin W. Klomsdorf, Libertyville, IL (US); Gregory W. Chance, Round Lake Beach, IL (US); Christopher N. Kurby, Elmhurst, IL (US); Dale G. Schwent, Schaumburg, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1211 days.

(21) Appl. No.: 11/216,880

(22) Filed: Aug. 31, 2005

(65) Prior Publication Data

US 2007/0047625 A1   Mar. 1, 2007

(51) Int. Cl.
*H04B 1/00* (2006.01)
(52) U.S. Cl. ........ 375/141; 375/144; 375/219; 375/220; 375/284; 375/285; 375/296
(58) Field of Classification Search .................. 375/141, 375/144, 219, 220, 284, 285, 296
See application file for complete search history.

(56) References Cited

U.S. PATENT DOCUMENTS

| | | | |
|---|---|---|---|
| 4,904,993 A | 2/1990 | Sata | |
| 4,972,455 A | 11/1990 | Phillips | |
| 5,034,997 A | 7/1991 | Iwasaki | |
| 5,138,649 A | 8/1992 | Krisbergh et al. | |
| 5,309,502 A | 5/1994 | Hirai | |
| 5,343,319 A | 8/1994 | Moore | |
| 5,500,691 A | 3/1996 | Martin et al. | |
| 5,585,953 A | 12/1996 | Zavrel | |
| 5,659,883 A | 8/1997 | Walker et al. | |
| 5,675,395 A | 10/1997 | Martin et al. | |
| 5,907,418 A | 5/1999 | Walczak et al. | |
| 5,929,770 A | 7/1999 | Faita | |
| 5,930,706 A | 7/1999 | Raith | |
| 5,946,120 A | 8/1999 | Chen | |
| 5,999,294 A | 12/1999 | Petsko | |
| 6,081,356 A | 6/2000 | Branc et al. | |
| 6,093,146 A | 7/2000 | Filangeri | |
| 6,104,512 A | 8/2000 | Batey, Jr. et al. | |
| 6,119,023 A | 9/2000 | Tomiyori | |
| 6,396,612 B1 | 5/2002 | Bjorndahl | |
| 6,424,285 B1 | 7/2002 | Perdue et al. | |
| 6,549,567 B1 | 4/2003 | Fullerton | |

(Continued)

FOREIGN PATENT DOCUMENTS

DE     4433896 C1    9/1995

(Continued)

OTHER PUBLICATIONS

Journal of Suzhou University (Natural Science) vol. 13, No. 3, Jul. 1997 (Japanese).

(Continued)

*Primary Examiner* — Siu Lee
(74) *Attorney, Agent, or Firm* — Roland K. Bowler, II

(57) ABSTRACT

A multimode wireless communication device capable of communicating pursuant to first and second communication protocols, including a method wherein a determination is made (530) as to whether a harmonic generated during transmission in one protocol interferes with reception in another protocol, and wherein transmission is suspended while receiving only if a harmonic generated during transmission interferes with reception. In some embodiments, the transmitter is temporarily operated in compressed mode to enable the suspension.

20 Claims, 4 Drawing Sheets

U.S. PATENT DOCUMENTS

| | | | |
|---|---|---|---|
| 6,574,482 B1 | 6/2003 | Radomsky et al. | |
| 6,782,208 B1 | 8/2004 | Lundholm et al. | |
| 6,999,438 B2 * | 2/2006 | Nounin et al. | 370/332 |
| 7,043,208 B2 | 5/2006 | Nigra | |
| 7,089,033 B2 * | 8/2006 | Leinonen et al. | 455/553.1 |
| 7,095,730 B1 * | 8/2006 | Raaf | 370/342 |
| 7,177,280 B2 * | 2/2007 | Aoki | 370/235 |
| 7,239,615 B2 * | 7/2007 | Nevo et al. | 370/278 |
| 7,366,128 B2 * | 4/2008 | Hundal et al. | 370/328 |
| 2002/0176385 A1 * | 11/2002 | Huh et al. | 370/335 |
| 2003/0045333 A1 | 3/2003 | Kimata et al. | |
| 2003/0060206 A1 * | 3/2003 | Sointula et al. | 455/450 |
| 2003/0100278 A1 | 5/2003 | Devaney et al. | |
| 2003/0228892 A1 | 12/2003 | Maalismaa et al. | |
| 2004/0063425 A1 * | 4/2004 | Wakutsu et al. | 455/418 |
| 2004/0127185 A1 * | 7/2004 | Abrahams et al. | 455/277.1 |
| 2004/0176039 A1 | 9/2004 | Leyh et al. | |
| 2004/0218562 A1 * | 11/2004 | Orava et al. | 370/329 |
| 2004/0266342 A1 | 12/2004 | Kontola et al. | |
| 2005/0008371 A1 | 1/2005 | Lundholm et al. | |
| 2006/0135195 A1 * | 6/2006 | Leinonen et al. | 455/550.1 |
| 2006/0197538 A1 * | 9/2006 | Leinonen et al. | 324/533 |
| 2006/0217139 A1 * | 9/2006 | Gunzelmann et al. | 455/502 |
| 2010/0035562 A1 | 2/2010 | Alberth, Jr. et al. | |

FOREIGN PATENT DOCUMENTS

| | | |
|---|---|---|
| JP | 09091916 A | 10/1998 |
| WO | 9505709 A1 | 2/1995 |
| WO | 0189102 A1 | 11/2001 |
| WO | 04001993 A1 | 12/2003 |
| WO | 2006128948 A1 | 12/2006 |
| WO | 2007096683 A1 | 8/2007 |

OTHER PUBLICATIONS

Journal of Suzhou University (Natural Science) vol. 13, No. 3, Jul. 1997 (3 Pages English Translation) "Studies on Miniature Wireless Transmission of Time-Division Multiplexing".

Om Malik, 700 MHz Explained in 10 Steps, Mar. 14, 2007, http://gigaom.com/2007/03/14/700,hz-explained/, Giga Omni Media, Inc.

Claude Desset et al, WiMAX Downlink OFDMA Burst Placement for Optimized Receiver Duty-Cycling, IEEE Communications Society ICC 2007 Proceedings, pp. 5149-5154.

Patent Cooperation Treaty, "PCT Search Report and Written Opinion of the International Searching Authority" for International Application No. PCT/US2009/051889 Dec. 11, 2009, 13 pages.

United States Patent and Trademark Office, "Non-Final Rejection" for U.S. Appl. No. 12/186,276 Jun. 2, 2011, 10 pages.

* cited by examiner

| RAT | BAND# | REGION | TX BAND (MHz) | | TX 2nd HARMONICS (MHz) | | TX 3rd HARMONICS (MHz) | |
|---|---|---|---|---|---|---|---|---|
| | | | LOW | HI | LOW | HI | LOW | HI |
| W | V | NORTH AMERICA | 824 | 849 | 1648 | 1698 | 2472 | 2547 |
| C | VI | JAPAN | 830 | 840 | 1660 | 1680 | 2490 | 2520 |
| D | III | EUROPE | 1710 | 1785 | 3420 | 3570 | 5130 | 5355 |
| M | II | NORTH AMERICA | 1850 | 1910 | 3700 | 3820 | 5550 | 5730 |
| | I | EUROPE, JAPAN | 1920 | 1980 | 3840 | 3960 | 5760 | 5940 |
| A | IV | NORTH AMERICA | 1710 | 1755 | 3420 | 3510 | 5130 | 5265 |

*FIG. 2*

| 300 | 310 | 312 | 320 RX BAND (MHz) | |
|---|---|---|---|---|
| | BAND | REGION | LOW | HI |
| | 802.11a | NORTH AMERICA, EUROPE | 5150 | 5350 |
| | 802.11h | EUROPE | 5470 | 5725 |
| | 802.11a | NORTH AMERICA | 5725 | 5850 |
| | 802.11b/g | NORTH AMERICA, EUROPE | 2400 | 2483.5 |
| | 802.11b/g | JAPAN | 2400 | 2497 |
| | BLUETOOTH | ALL | 2400 | 2483.5 |
| | 802.16 | EUROPE | 3410 | 4200 |

MULTI-MODE WIRELESS COMMUNICATION DEVICE AND METHOD

FIELD OF THE DISCLOSURE

The present disclosure relates generally to wireless communications, and more particularly to multi-mode communication devices, for example, mobile communication handsets, capable of operating on different radio access technologies and methods.

BACKGROUND

In the evolution of mobile wireless communications, inter-radio access technology handovers in multi-mode wireless communication devices are required to provide uninterrupted mobile service. Exemplary radio access technology protocols considered for implementation in contemporary multi-mode communication devices include WCDMA, GSM, WLAN including 802.11 and 802.16e, and Bluetooth. Multi-mode handsets incorporating these and other radio access technologies will however be susceptible to interference during transmission and reception on different frequency bands.

It is known generally to blank operation of a receiver to avoid interference by a transmitter as disclosed, for example, in U.S. Publication No. 2004/0176039 entitled "Multimode Background Scans of Different Communication Systems On Similar Frequencies".

The various aspects, features and advantages of the instant disclosure will become more fully apparent to those having ordinary skill in the art upon careful consideration of the following Detailed Description thereof with the accompanying drawings described below.

BRIEF DESCRIPTION OF THE DRAWINGS

FIG. 2 is table of various WCDMA bands and corresponding second and third order harmonics.

DETAILED DESCRIPTION

In some multi-mode wireless communication devices, harmonics generated during transmission by a transmitter interferes with signals received by a receiver. Exemplary multi-mode wireless communication devices include, but are not limited to, cellular communication handsets, personal digital assistants (PDAs), and other multi-mode wirelessly enabled devices including laptop and notebook computers, which may be configured with a cellular communication adapter and Bluetooth and/or WLAN capabilities.

Figure 1:
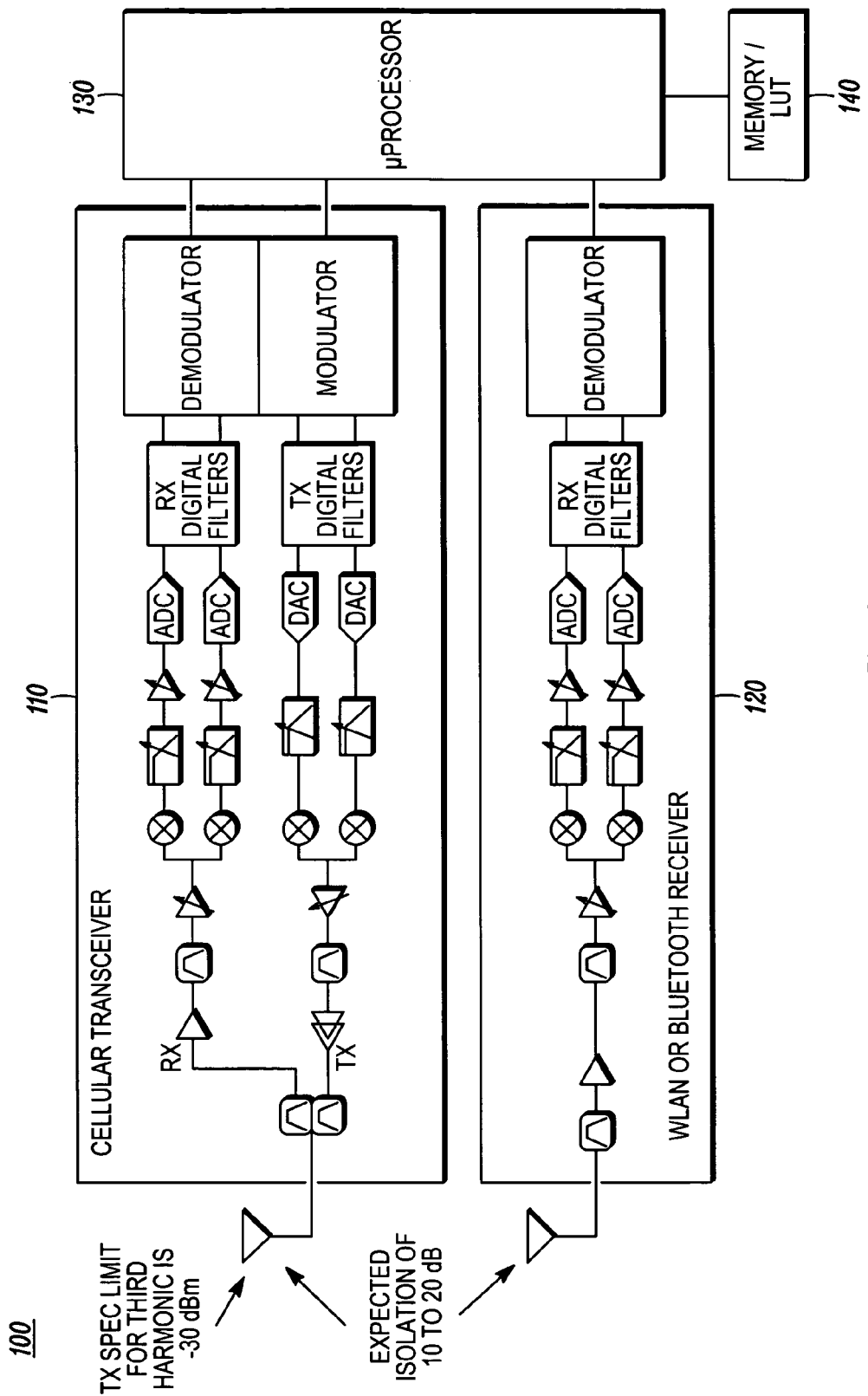
FIG. 1 is an exemplary multi-mode wireless communication device.

In FIG. 1, the illustrative multi-mode device 100 comprises a cellular transceiver 110 and a second transceiver 120. In one embodiment, the first receiver is a WCDMA transceiver that transmits on one or more WCDMA bands and the second transceiver includes a WLAN and/or a Bluetooth receiver. The architecture of the exemplary transmitter and receiver is known generally by those having ordinary skill in the art and not discussed further herein. The transmitter 110 and the receiver 120 are communicably coupled to a controller 130, for example, a microprocessor and/or a digital signal processor (DSP). The controller is communicably coupled to memory 140. The controller is also communicably coupled to other elements including, but not limited to, a user interface, display and other elements typical of a wireless communication device, as is known generally by those of ordinary skill.

In FIG. 2, table 200 illustrates various Bands for WCDMA radio access technology at column 210. The corresponding geographical regions where the Bands are utilized are indicated in column 212. For each Band, the table illustrates the corresponding transmit frequency ranges at column 220, the corresponding second order harmonic frequency range at column 230 and the corresponding third order harmonic frequency range at column 240. The harmonic frequency ranges illustrated in FIG. 2 are harmonic center frequencies. Associated with each harmonic center frequency is a spectrum having tails with decreasing amounts of energy farther from the corresponding center frequency or energy maximum. Thus the effect of the harmonics extends beyond the harmonic frequency ranges identified in FIG. 2. Whether harmonic frequencies beyond the indicated ranges have an adverse affect on the received signal depends on the relative strength of the harmonic and the received signal.

Figures 3, 4:
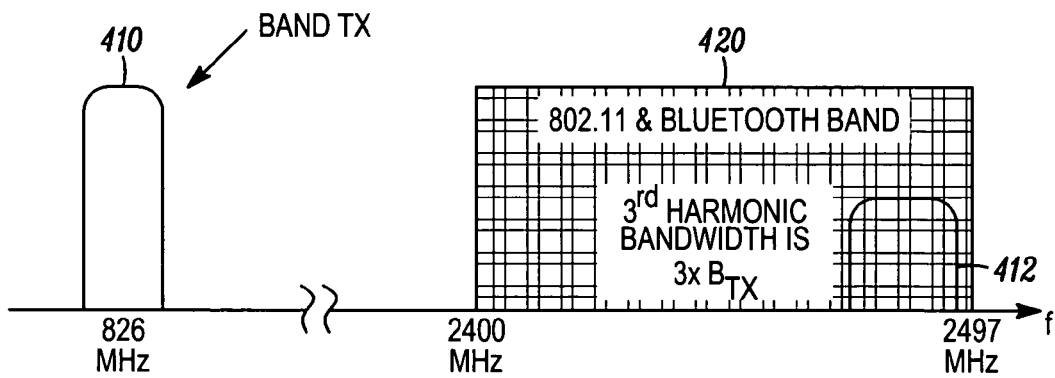
FIG. 3 is a table of various Bluetooth and WLAN receive frequency ranges.
FIG. 4 illustrates overlap between a WCDMA transmit band and WLAN and Bluetooth receive bands.

In FIG. 3, table 300 illustrates WLAN and Bluetooth receive center frequency ranges. Particularly, in FIG. 3, column 310 identifies various WLAN bands including the 802.11a, 802.11b, 802.11g and 802.11h and 802.16 protocols. FIG. 3 also illustrates the receive center frequency ranges for the Bluetooth protocol. Column 312 identifies the corresponding geographical regions where the various bands in column 310 are utilized. The protocols and frequency ranges in FIG. 3 are illustrative only. Column 320 illustrates the high and low frequency ranges for the corresponding bands identified in column 310.

Whether a harmonic generated during transmission pursuant to one communication protocol will interfere with reception pursuant to another protocol may be determined generally by comparing the transmit frequency bands, including the harmonics, with the received frequency bands. However, overlap between the harmonic center frequency ranges in FIG. 2 and the receive frequency ranges in FIG. 3 is not generally necessary for interference to occur. As noted above, energy exits at frequencies above and below each center harmonic frequency, though the magnitude of the energy decreases with increasing distance form the center frequency. In FIG. 2, for example, the third harmonic frequencies, between approximately 2490 and 2520 MHz, of WCDMA Band VI may potentially interfere with the 802.11b/g (Japan) receive band with center frequencies between 2400 and 2497 MHz illustrated in FIG. 3. FIG. 4 illustrates a transmission band 410 centered about 826 MHz having a third harmonic 412 that falls within a receive band 420 for 802.11/Bluetooth.

In FIG. 2, in another example, the third harmonic frequencies between approximately 2472 and 2547 MHz of WCDMA Band V in FIG. 2, overlap with the 802.11b/g (North America & Europe) and with the Bluetooth receive frequency bands with center frequencies between approximately 2400 and 2483 MHz illustrated in FIG. 3. In another illustrative application, a third harmonic generated during transmission pursuant to WCDMA band VI may unduly interfere with Bluetooth protocol reception. In another embodiment, second harmonic frequencies with center frequencies between approximately 3840 and 3960 MHz in WCDMA Band I may interfere with the European 802.16 receive band with center frequencies between approximately 3410 and 4200 MHz. The overlap or near overlap between the transmit frequency and/or harmonics and the received bands indicates only that there is potential for interference, which is also dependent generally on the transmit level and received signal strength.

The examples above are illustrative only and are non-exhaustive. Generally, transmissions associated with communication protocols other than WCDMA may also produce harmonics that interfere with reception pursuant to WLAN and/or Bluetooth and/or other open and/or proprietary wireless communication protocols. Thus the present disclosure is not to be limited to situations where the interference occurs between the exemplary WCDMA and WLAN/Bluetooth protocols. Moreover, the disclosure is not limited to the case where the interference results from $2^{nd}$ and/or $3^{rd}$ order harmonics of the transmitted signal. Higher order harmonics may also cause interference depending on the relative frequency bands, transmit power level, and received signal strength.

In the multi-mode wireless communication device 100 of FIG. 1, the controller 130 determines whether one or more harmonics generated during transmission by the transmitter 110 will interfere with reception by receiver 120. In one embodiment, in FIG. 1, the controller 130 makes this determination by reference to a look-up table (LUT) stored in memory 140. The controller generally suspends transmission while receiving only if a harmonic generated during transmission is expected or likely to interfere with reception of the received signal to the extent that the received signal is unreliable or otherwise unacceptable. In one implementation, this would be based only on transmitter bands or channel frequencies that are known to produce harmonics in the receive band of interest. In other cases, the expected interference levels could be pre-calculated and stored in the LUT for later reference.

In one embodiment, the power level of the transmitter is considered when determining whether transmit harmonics will interfere with the received signal. In other embodiments, the received signal strength is also considered when determining whether there will be any interference. For example, the look-up table could include data for different transmit power levels and for different receive signal strengths for each frequency band transmitted and received. Thus for a particular transmit power level at a particular frequency, the look-up table will indicate whether there will be interference with the received signal. In embodiments where received signal strength is available, the look-up table could indicate whether there will be any interference of the received signal at the received signal strength. Under these circumstances, the transmitter may be suspended or the receiver blanked if the received signal strength is less than some threshold relative to the interfering harmonic, the strength of which is known based on the transmit power level. The received signal strength, for example, the signal received by the WLAN or Bluetooth receiver in FIG. 1, may be measured by the device 100. If the received signal strength is sufficiently greater than the predetermined expected harmonic interference level, the harmonic interference will have a tolerable affect, and suspension of the transmitter will not be required.

In some wireless protocols, for example, WCDMA, the transmitter may operate in a continuous mode. When suspension of the transmit signal is required to prevent undue interference of the received signal, the transmitter may operate in a compressed mode, wherein the data rate is increased to compensate for the interval during which transmission is suspended. Thus the utilization of compressed mode enables transmission suspension without loss of information to be transmitted. In compressed mode, data is temporarily transmitted at a higher data rate than the rate at which continuous transmission occurs. For example, the data rate may be increased just before and just after the interval during which the transmitter is suspended. Compressed mode operation, for example, in WCDMA, is known generally by those having ordinary skill in the art and is not discussed further herein.

Figure 5:
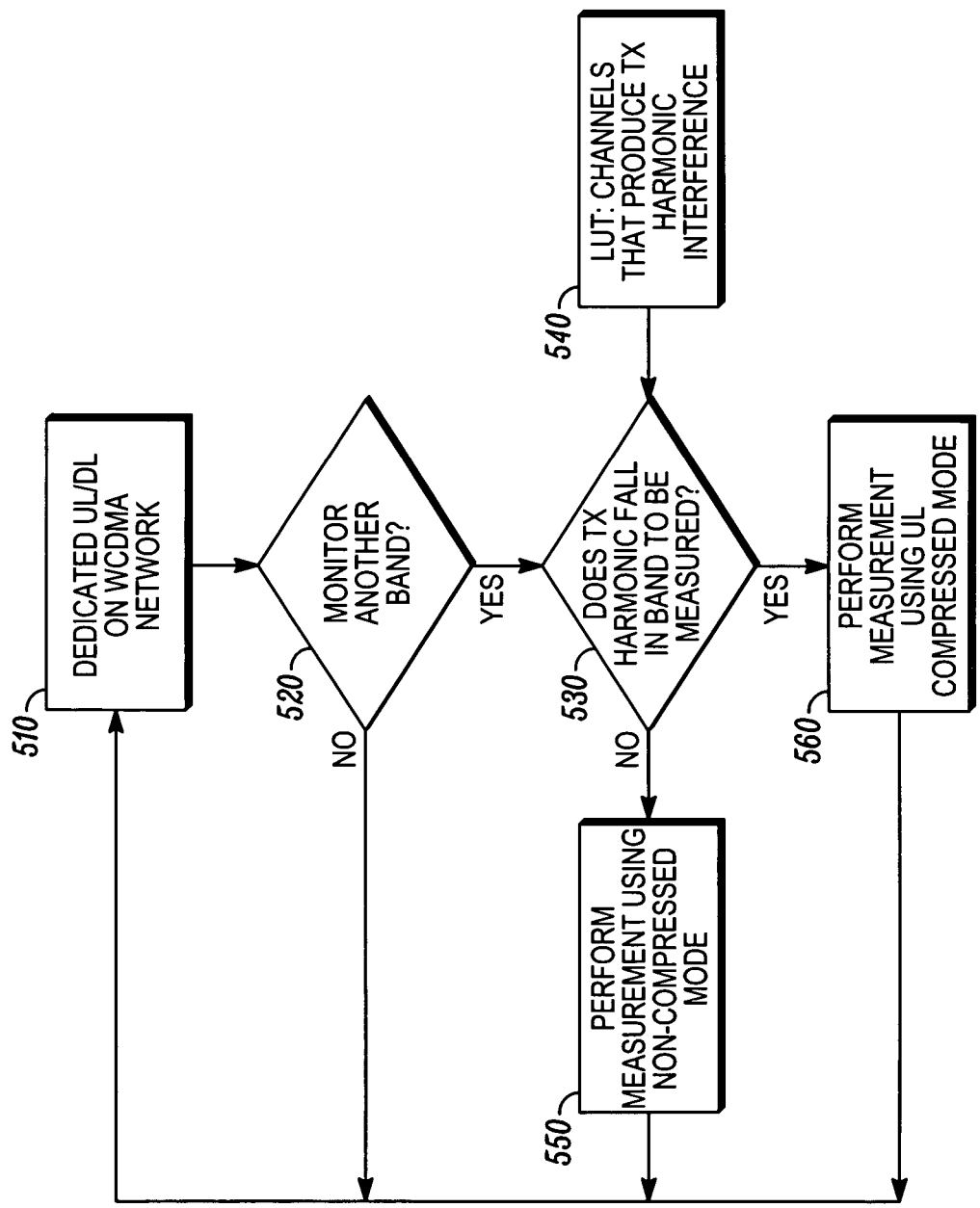
FIG. 5 is an illustrative block flow diagram.

In the illustrative process 500 of FIG. 5, at block 510, the multi-mode wireless communication device operates on a dedicated uplink/downlink in a WCDMA communication network or in some other present or future continuous operating mode network. At 520, a determination is made as to whether the wireless communication device is or should monitor, for example, measure another band, for example, a WLAN or Bluetooth frequency band. If a receive band is to be monitored at block 520, a determination is made at block 530 as to whether any transmit harmonic falls within the band to be received or measured. This determination may be made using information in look-up table 540 as discussed above. At block 550, the measurements are made using non-compressed mode if there is no interference between the harmonics and received signal. At block 560, measurements are performed on the received signal during intervals during which the transmitter is suspended and the transmitter is operated in compressed mode to enable suspension of the transmission.

While the present disclosure and what are presently considered to be the best modes thereof have been described in a manner establishing possession by the inventors and enabling those of ordinary skill in the art to make and use the same, it will be understood and appreciated that there are many equivalents to the exemplary embodiments disclosed herein and that modifications and variations may be made thereto without departing from the scope and spirit of the inventions, which are to be limited not by the exemplary embodiments but by the appended claims.

What is claimed is:

1. A method in a multimode wireless communication device capable of communicating pursuant to first and second communication protocols, the method comprising:
   transmitting a signal from the wireless communication device pursuant to the first communication protocol;
   receiving a signal at the wireless communication device pursuant to the second communication protocol;
   determining whether a harmonic generated during transmission pursuant to the first communication protocol interferes adversely with reception pursuant to the second communication protocol based on a power of the harmonic generated relative to a power of the signal received pursuant to the second communication protocol;
   suspending transmission pursuant to the first communication protocol while receiving pursuant to the second communication protocol only if a harmonic generated during transmission pursuant to the first communication protocol interferes adversely with reception pursuant to the second communication protocol, wherein transmitting pursuant to the first communication protocol is not synchronized with receiving pursuant to the second communication protocol.

2. The method of claim 1, compensating for periods during which transmission pursuant to the first communication protocol is suspended by temporarily transmitting pursuant to the first communication protocol at a higher data rate than would be required if transmission pursuant to the first communication protocol was continuous.

3. The method of claim 1,
   determining whether a second order harmonic generated during transmission pursuant to the first communication protocol interferes with reception pursuant to the second communication protocol,
   suspending transmission pursuant to the first communication protocol while receiving pursuant to the second communication protocol only if the second harmonic interferes with the reception.

4. The method of claim 1,
   determining whether a third order harmonic generated during transmission pursuant to the first communication protocol interferes with reception pursuant to the second communication protocol,
   suspending transmission pursuant to the first communication protocol while receiving pursuant to the second communication protocol only if the third harmonic interferes with the reception.

5. The method of claim 1, determining a strength of the harmonic based on a power of the signal transmitted pursuant to the first communication protocol.

6. The method of claim 1,
   first communication protocol is WCDMA bands V or VI and the second communication protocol is Bluetooth,
   determining whether a third harmonic generated during transmission pursuant to WCDMA bands V or VI interferes with reception pursuant to the Bluetooth protocol.

7. The method of claim 1,
   first communication protocol is WCDMA band V, the second communication protocol is 802.11 receiving at center frequencies between approximately 2400 MHz and approximately 2483 MHz,
   determining whether a third harmonic generated during transmission pursuant to WCDMA band V interferes with reception pursuant to the 802.11 protocol.

8. The method of claim 1,
   first communication protocol is WCDMA bands V or VI, the second communication protocol is 802.11 receiving at center frequencies between approximately 2400 MHz and approximately 2497 MHz,
   determining whether a third harmonic generated during transmission pursuant to WCDMA bands V or VI interferes with reception pursuant to the 802.11 protocol.

9. The method of claim 1, the first communication protocol is a continuous transmission mode protocol operable in a compressed transmission mode, utilizing the compressed transmission mode to enable transmission suspension without loss of information to be transmitted.

10. A multimode wireless communication device, comprising:
    a wireless transmitter that transmits pursuant to a first communication protocol;
    a wireless receiver that receives pursuant to a second communication protocol different than the first communication protocol;
    a controller communicably coupled to the transmitter and the receiver,
    the controller determining whether a harmonic generated during transmission by the transmitter interferes with reception by the receiver based on a power of the harmonic relative to a power of the transmitter,
    the controller suspending transmission by the transmitter while receiving by the receiver only if it is determined that a harmonic generated during transmission interferes with reception, wherein the second communication protocol is not scheduled by the first communication protocol.

11. The device of claim 10,
    a look up table stored in memory communicably coupled to the controller,
    the controller determining whether the harmonic generated during transmission interferes with reception based on the look up table.

12. The device of claim 10, the controller compensating for periods during which transmission is suspended by temporarily transmitting at a higher data rate.

13. The device of claim 10,
    the controller determining whether a second order harmonic generated during transmission interferes with reception,
    the controller suspending transmission while receiving only if the second harmonic interferes with reception.

14. The device of claim 10,
    the controller determining whether a third order harmonic generated during transmission interferes with reception,
    the controller suspending transmission while receiving only if the third harmonic interferes with the reception.

15. The device of claim 10, the first communication protocol is a continuous transmission mode protocol, the wireless transmitter operating in compressed mode to enable transmission suspension.

16. The device of claim 10,
    first communication protocol is WCDMA bands V or VI, the second communication protocol is Bluetooth,
    the controller determining whether a third harmonic generated during transmission pursuant to WCDMA bands V or VI interferes with reception pursuant to the Bluetooth protocol.

17. The device of claim 10,
    first communication protocol is WCDMA band V, the second communication protocol is 802.11 receiving at center frequencies between approximately 2400 MHz and approximately 2483 MHz,
    the controller determining whether a third harmonic generated during transmission pursuant to WCDMA band V interferes with reception pursuant to the 802.11 protocol.

18. The device of claim 10,
    first communication protocol is WCDMA bands V or VI, the second communication protocol is 802.11 receiving at center frequencies between approximately 2400 MHz and approximately 2497 MHz,
    the controller determining whether a third harmonic generated during transmission pursuant to WCDMA bands V or VI interferes with reception pursuant to the 802.11 protocol.

19. The device of claim 10,
    first communication protocol is WCDMA band I, the second communication protocol is 802.16 receiving at center frequencies between approximately 3410 MHz and approximately 4200 MHz,
    the controller determining whether a second harmonic generated during transmission pursuant to WCDMA band I interferes with reception pursuant to the 802.16 protocol.

20. A method in a multimode wireless communication device capable of communicating pursuant to first and second communication protocols, the method comprising:
    transmitting a signal from the wireless communication device pursuant to the first communication protocol;
    receiving a signal at the wireless communication device pursuant to the second communication protocol;

determining whether a harmonic generated during transmission pursuant to the first communication protocol interferes with reception pursuant to the second communication protocol;

suspending transmission pursuant to the first communication protocol while receiving pursuant to the second communication protocol only if a harmonic generated during transmission pursuant to the first communication protocol interferes with reception pursuant to the second communication protocol;

compensating for periods during which transmission pursuant to the first communication protocol is suspended by temporarily transmitting pursuant to the first communication protocol at a higher data rate than would be required if transmission pursuant to the first communication protocol was not suspended.

\* \* \* \* \*